(12) United States Patent
Pecen et al.

(10) Patent No.: US 7,564,823 B2
(45) Date of Patent: Jul. 21, 2009

(54) METHOD AND APPARATUS FOR COMMUNICATING DATA UPON MULTIPLE RADIO CARRIERS

(75) Inventors: Mark Pecen, Waterloo (CA); Mihal Lazaridis, Waterloo (CA); Sean Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 355 days.

(21) Appl. No.: 11/271,518

(22) Filed: Nov. 10, 2005

(65) Prior Publication Data

US 2007/0104134 A1 May 10, 2007

(51) Int. Cl.
*G06F 15/16* (2006.01)
(52) U.S. Cl. ...................... 370/337; 370/462
(58) Field of Classification Search .................. 370/310,
370/321, 371, 462, 329, 331, 337, 338, 347,
370/348, 459, 442, 443, 379; 455/450, 455,
455/452, 512
See application file for complete search history.

(56) References Cited

U.S. PATENT DOCUMENTS 6,597,672 B1 7/2003 Gustafsson et al.
6,847,826 B1 * 1/2005 Wesby et al. ................. 455/502

2004/0151156 A1 8/2004 Noel et al.
2005/0078737 A1 * 4/2005 Craig et al. ................. 375/132

FOREIGN PATENT DOCUMENTS

EP 0938208 8/1999

OTHER PUBLICATIONS

Craig S., et al., "Synchronization Strategies for GSM/EDGE Networks", VTC 2001 Spring. IEEE VTS 53rd. Vehicular Technology Conference. Rhodes, Greece, May 6-9, 2001, IEEE Vehicular Technology Conf., New York, NY: IEEE, US, vol. 4 of 4, Conf. 53, May 6, 2001, pp. 2670-2674, XP001076243.

* cited by examiner

*Primary Examiner*—Sam Bhattacharya (57) ABSTRACT

Apparatus, and an associated method, for allocating communication resources in a data radio communication system, such as a communication system that provides for EDGE data communication services. A multi-carrier radio resource control logic element includes an analyzer that analyzes communication resource requirements to carry out a communication service, and a resource allocator allocates communication resources to be used by which to communicate the data. The communication resources are allocated across a plurality of mobile allocation index offsets, increasing the likelihood that increased amounts of communication resources can be allocated to perform a particular data communication service. A communication station that embodies the control logic element includes a wideband radio frequency transceiver from which the data is communicated during performance of the communication service.

18 Claims, 4 Drawing Sheets

METHOD AND APPARATUS FOR COMMUNICATING DATA UPON MULTIPLE RADIO CARRIERS

The present invention relates generally to the communication of data pursuant to a high-speed data communication service, such as an Enhanced Data for Global Evolution (EDGE) communication service. More particularly, the present invention relates to apparatus, and an associated method, that allocates communication resources according to a Mobile Allocation Index Offset scheme and that provides for the communication of data by way of the allocated communication resources.

BACKGROUND OF THE INVENTION

High-speed data services are increasingly performed by way of radio communication systems. Advancements in communication technologies have permitted the development and deployment of radio communication systems that permit the communication of data at high communication throughput rates. And, with continued advancements in communication technologies, improvements to such systems permit the throughput rates to be yet further increased. Various high-speed data services, and their associated mechanisms of implementation, are undergoing development, standardization, and implementation. An exemplary data communication service, referred to as GPRS (General Packet Radio Service) for GSM (Global System for Mobile communications) has achieved significant levels of deployment and usage. An extension to the general GPRS communication scheme, EDGE (Enhanced Data for Global Evolution) is presently undergoing deployment. Data throughput rates achievable in an EDGE-capable system are significantly higher than those achievable in its predecessor GPRS system.

While EDGE-based communications permit data to be communicated at substantially higher data rates than its GPRS predecessor, data services are becoming, and anticipated to become even more so, data-intensive. There is a continuing need to find ways yet further to increase the data throughput capabilities of EDGE-based communications to facilitate the speedy communication of increasingly data-intensive data communication services that are to be implemented in an EDGE-based, or other high-speed, data communication system.

Existing EDGE standard promulgations define, amongst other things, the channel structure used pursuant to EDGE-based communications. Channels are defined upon multiple carriers. But, due to various requirements, effectuation of a single communication service using communication resources upon multiple carriers is presently unavailable due to constraints in the standard promulgation.

If a manner could be provided in a high-speed data radio communication system to utilize more fully available time-slot/carrier combinations to perform a communication service, increased data throughput rates and spectral utilization would be achievable. Such a manner would also require communication apparatus and methodology that is able to operate in a manner that permits communications to be carried out using the time-slot/carrier combinations, once made available.

It is in light of this background information that the significant improvements of the present invention have evolved.

DETAILED DESCRIPTION

The present invention, accordingly, advantageously provides apparatus, and an associated method, that facilitates communication of data pursuant to a high-speed data communication service, such as an Enhanced Data for Global Evolution (EDGE) communication service or other communication system optionally utilizing frequency hopping.

Through operation of an embodiment of the present invention, a manner is provided by which to allocate communication resources across a plurality of radio carriers howsoever logically defined pursuant to a Mobile Allocation Index Offset (MAIO) scheme. The MAIO is an offset value to the actual Radio Frequency (RF) to implement frequency hopping, but is treated logically as an RF carrier itself. The likelihood of time slots being available for allocation across a plurality of carriers is greater than the likelihood of time slots being available for allocation on a single carrier, a limitation of existing allocation schemes.

By allocating communication resources across a plurality of index offsets, an increased likelihood that a contiguous series, such as a block, of time slots can be allocated for the performance of a data communication service during a communication session. When a contiguous sequence of time slots is available within a frame, the data is able to be communicated more quickly than when only making use of communication resources upon a single carrier for data communications during a communication session. And, even if contiguous time slots are not allocated, increased numbers of time slots allocated to a data communication session permits its completion due to the greater statistical level of resource allocation.

In one aspect of the present invention, the network part of the radio data communication system includes an analyzer that analyzes communication resource requirements needed to, or otherwise requested to, be provided pursuant to communicate data to perform a communication service during a communication session. The analyzer determines, for instance, the number of time slots that are needed to be allocated to the communication session to permit the data to be communicated between a set of communication stations. The determinations made by the analyzer are made, for instance, on a frame-by-frame basis, on a communication session basis, or upon another basis, all in a manner that permits dynamic resource allocation.

In another aspect of the present invention, the network part also includes a resource allocator that allocates resources to permit the communication of the data during a communication session to effectuate the communication service. The resource allocations are made, e.g., responsive to analysis of the communication requirements. The resource allocations are made across a plurality of MAIOs (Mobile Allocation Index Offsets) howsoever defined. When particular time slots are available on different index offsets or RF frequencies, allocations are made to communicate data pursuant to the communication session within the time slots of the different index offsets or RF frequencies. More generally, resources allocated by the resource allocator are not limited to selection of time slots on a single mobile allocation index offset or RF frequency but rather are allocated, when available, upon any index offset or frequency that the communication stations, parties to a communication session, are capable of operation.

In another aspect of the present invention, a message generator at the network part generates an allocation message that includes values identifying the communication resources allocated to communicate the data pursuant to effectuation of the communication service during a communication session. The allocation message is sent by the network part to a mobile station that is a party to the communication session pursuant to which data is to be communicated. If more than one mobile station is to be a party to the communication session, the allocation message is sent to each of the mobile stations. By sending the allocation message to each mobile station that is to be a party to the communication session, the mobile station is informed of the resource allocations, thereby to permit the mobile station to operate correctly to receive, or to transmit, communication data that is communicated during the communication session.

In another aspect of the present invention, the network station includes a baseband element that generates a single signal representative of the data that is to be communicated and a single, wideband radio frequency transmitter to which the single signal is applied. The transmitter transmits the signal forming the data on multiple carriers, in accordance with the resource allocation. In another aspect of the present invention, the mobile station includes a wideband radio frequency (RF) transceiver having a receive part capable of receiving data communicated thereto on a plurality of carriers. That is to say, the wideband RF transceiver provides for multi-carrier reception. Data streams communicated upon separate carriers are, for instance, independent data streams. In a further aspect, receiver diversity is provided by utilizing separate antennas connected to the wideband RF transceiver and, e.g., receiving data sent upon the same carrier at the separate, spaced-apart antennas.

The mobile station includes a detector that detects the allocation message, once broadcast by the network part to the mobile station. The detector ascertains the values of the allocation message thereby to identify the allocated resources.

The mobile station also includes a controller that controls operation of the mobile station in response to the communication resources detected by the detector to be used pursuant to the communication of the data. The controller, amongst other things, controls operations of wideband radio frequency receiver element, thereby to provide intelligent control over reception of data that is communicated between the network and the mobile station.

Communication resources are allocated in a manner that facilitates improved data throughput rates of the data that is communicated pursuant to performance of the communication session. The allocation is made to maximize the sum of time slots allocated for the communication session within the constraints of the capabilities of the communication stations that are parties to the communication session and to the reaction times of the communication stations needed to switch to the different radio carriers upon which communication resources are allocable.

In these and other aspects, therefore, apparatus, and an associated method, is provided for a communication station operable to communicate data. An analyzer is adapted to receive an indication of a characteristic of the data that is to be communicated by the first communication station. The analyzer is configured to analyze communication requirements required for the communication of the data. A resource allocator is adapted to receive an indication of the analysis made by the analyzer. The resource allocator is configured to allocate resources across a plurality of mobile allocation index offsets or frequencies for communication of the data. A wideband radio frequency element is adapted to receive an indication of allocation made by the resource allocator. The wideband radio frequency element is configured to receive data that is communicated over a plurality of carriers.

In these and other aspects, therefore, further apparatus, and an associated method, is provided for a communication station operable pursuant to communication of data. A wideband radio frequency element is adapted to detect data communicated to the communication station across a plurality of carriers. A detector is configured to detect an allocation message delivered to the radio frequency element of the communication station. The allocation message identifies communication resources allocated to the communication station pursuant to the communication of the data. The resources that are allocated are allocated across a plurality of mobile allocation index offsets or carrier frequencies, e.g., radio carriers howsoever logically defined. A controller is adapted to receive an indication of detections made by the detector. The controller is configured to control operation of the radio frequency element responsive to the detections.

Figure 1:
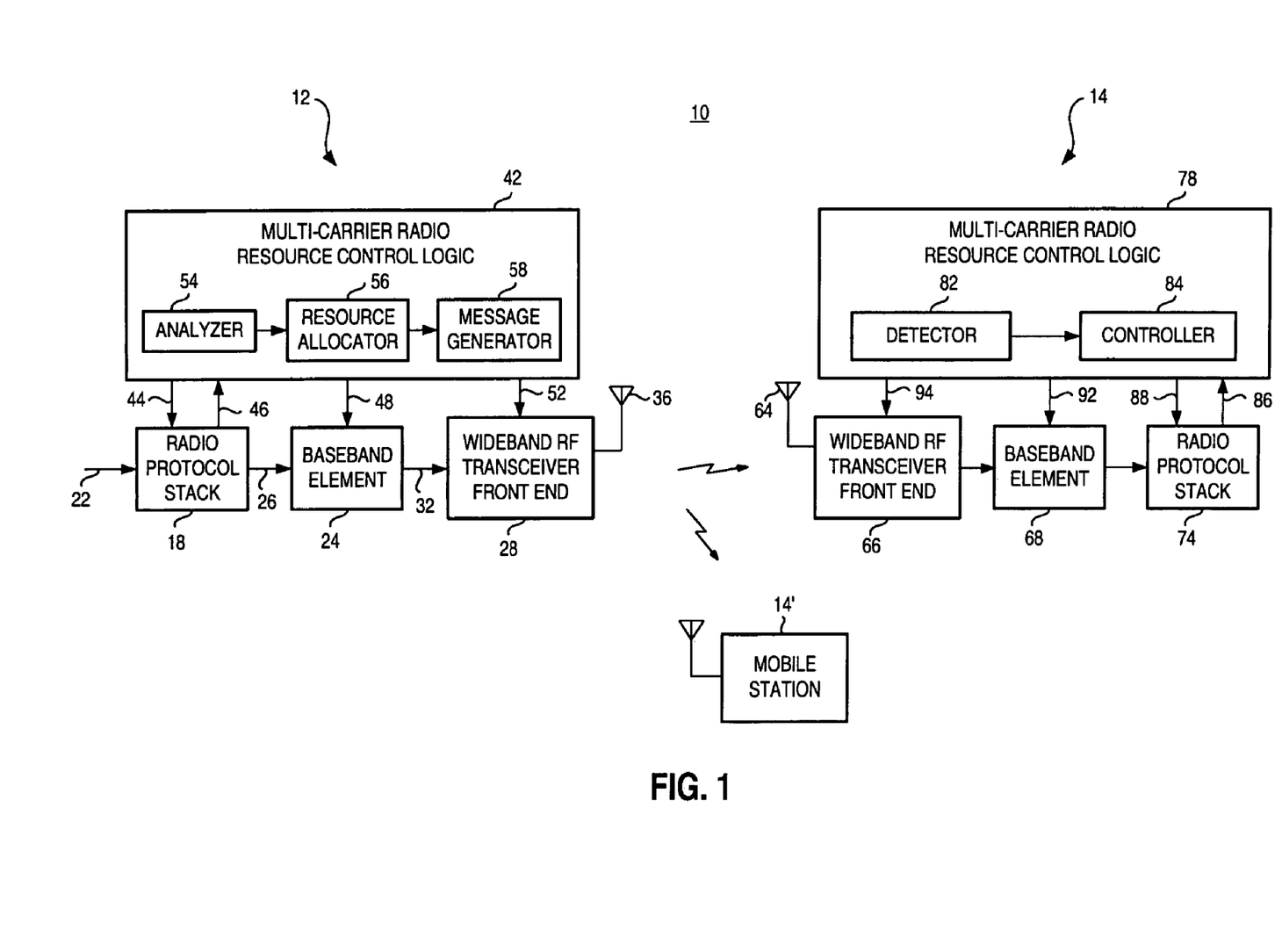
FIG. 1 illustrates a functional block diagram of an exemplary communication system that includes an embodiment of the present invention as a portion thereof.

With these and other aspects in mind, therefore, reference is first made to FIG. 1 that illustrates a communication system, shown generally at 10. The communication system is operable pursuant to an embodiment of the present invention. In the exemplary implementation, the communication system 10 forms a radio data communication system that provides for EDGE (Enhanced Data for Global Evolution) data services. While the following description shall describe exemplary operation of the communication system in terms of its exemplary implementation to provide for EDGE-based communication services, it should be understood that the teachings of the present invention are analogously applicable to other types of communication systems, e.g., operable pursuant to operating specifications that define other types of communication systems. Accordingly, the description of operation of the communication system 10 is for purposes of explanation only and not of limitation.

In the illustration of FIG. 1, the communication system includes a set of communication stations, communication stations 12 and 14. Here, the communication station 12 is representative of elements of a network part of the communication system and shall be referred to, at times, as a network station 12. And, the communication station 14 is representative of a mobile station and shall, at times, subsequently be referred to as a mobile station. During operation, either of the communication stations 12 and 14 are capable of generating EDGE data for communication to effectuate an EDGE data service during a communication session. Operation shall be described with respect to effectuation of a downlink, EDGE communication service, i.e., EDGE data communicated by the network station 12 for delivery to the mobile station 14. Operation of the communication system to communicate data in an uplink direction can be analogously described. A communication station 14' is also shown in the figure. The communication station 14' is representative of the multi-access nature of the communication system. During exemplary operation, separate EDGE communication services are effectual with both the communication station 14 and the communication station 14'.

The communication system operates in general conformity with the EDGE/GPRS/GSM (Enhanced Data for Global Evolution/General Packet Radio Service/Global System for Mobile communications) operating specifications, particularly with respect to the EDGE channel structure defined therein. The EDGE channel structure defines a TDMA (Time Division Multiple Access) scheme including frames that comprise eight time slots. A maximum transmission rate of 59.2 kb/s per time slot is permitted. When a communication service is to be effectuated, communication resources, i.e., time slots within frames defined upon a carrier available for communication, are allocated for the communication of the EDGE data thereon. Theoretically, all eight time slots of a frame can be allocated to a single communication session, thereby permitting a maximum transmission rate of 473.6 kb/s (8*59.2 kb/s=473.6 kb/s). However, in actual practice, allocation of such a large number of time slots on a single carrier, or, more generally, a single mobile allocation index offset or frequency is unachievable. Other operating requirements of the EDGE/GPRS/GSM system necessitate that a mobile station make various measurements, such as measurements that are required to be taken on signals broadcast in adjacent cells, i.e., cells adjacent to the active cell in which the mobile station is positioned. The operating specification, TS 45.008 [5] and TS 45.0002 [2], Annex B specify and define certain of these measurements. Additionally, due to the multi-access nature of the communication system, communication services, both data and traffic services, are performed by other communication station sets. Competition for communication resources limits the availability of contiguous time slots that are available to be allocated to effectuate a communication service. If, for instance, there is a sixty percent probability of availability of a single time slot for assignment, the statistical probability of six contiguous time slots on a single carrier being available is only 4.67 percent. And the probability of eight contiguous time slots on a single carrier being available drops to 1.68 percent. Even putting aside the limitations due to the need of a mobile station to make measurements, there is a statistically small likelihood that multiple, contiguous time slots would be available on a single carrier for allocation pursuant to a single communication service. While contiguous time slots are sometimes available on other radio carriers, to date, particularly in an EDGE-based system, allocating time slots on different radio carriers is not permitted.

The elements of the communication stations 12 and 14 are functionally represented and are formed of functional elements, implementable in any desired manner. Additionally, while the functional elements are represented together, the physical locations at which the elements are formed need not be in common. For example, the elements shown to form portions of the network station 12 need not be positioned at a single physical location, e.g., at a base transceiver station of the network part. Rather, the elements of the network station, in one implementation, are distributed amongst more than one location, such as at the base transceiver station and at a base station controller. The network station includes a radio protocol stack 18 to which user application data is applied by way of the line 22. The user application data is for communication to one or more mobile stations pursuant to one or more EDGE communication sessions. The radio protocol stack includes various logical layers including a radio resource management (RRM) layer.

The network station further includes a baseband element 24 to which data is provided, here represented by way of the lines 26. The baseband element performs various baseband operations including baseband processing, modulation, and channel coding.

The network part also includes a wideband RF (radio frequency) transceiver front end 28 to which data is applied by the baseband element 24. The transceiver operates to transmit multiple, contiguous radio frequency channels converted from a single baseband signal by way of one or more antenna transducers 36. The wideband nature of the transceiver permits its operation to send data upon different radio frequencies or mobile allocation index offsets, pursuant to an embodiment of the present invention.

Pursuant to an embodiment of the present invention, the communication station 12 further includes a multi-carrier radio resource control logic element 42. The element 42 is at least functionally coupled to the radio protocol stack 18, represented by way of the lines 44 and 46, to the baseband element 24, here represented by way of the lines 48 and to the radio element 28, here represented by way of the lines 52. In the exemplary implementation, the element 42 is embodied at a radio resource management logical layer.

The multi-carrier radio resource control logic element includes an analyzer 54, a resource allocator 56, and an allocation message generator 58. The analyzer 54 receives indications of the data that is to be communicated by the network part to a mobile station pursuant to effectuation of a communication service during a communication session. The indication of the characteristic comprises, for instance, the amount of data that is to be communicated, or some type of indicia that through analysis by the analyzer permits the communication requirements to communicate the data to be analyzed. Indications of the analysis performed by the analyzer are provided to the resource allocator. The resource allocator allocates resources based upon the analysis made by the analyzer together with indications of data scheduling information. The communication resource allocations are made across a plurality of logically-defined radio carriers, within the operational range of the transceiver 28, according to a mobile allocation index offset scheme. In the exemplary implementation, a time slot and radio carrier, defined in terms of a mobile allocation index offset, combination is provided for each of the allocations. Depending upon the capabilities of the communication stations that are to be parties to the communication session in which the data is communicated to effectuate the communication service, the allocations include time slots allocated on different carriers at concurrent times. And, the number of radio carriers across which the allocations are made is also dependent upon the capabilities of the communication stations. For an allocation to be permitted, the communication stations must further be capable of communicating at the frequency of the radio carrier. The allocations made by the resource allocator are also dependent upon such criteria, indications of which are further applied to the radio resource control logic 42.

Control messages are generated by the resource allocator and provided to the radio protocol stack, the baseband element, and the RF element to control their operation in conformity with the allocation of resources made by the allocator. An indication of the allocated resources is also provided to the allocation message generator 58. The message generator generates an allocation message that is provided to the RF transceivers 28 for communication to the mobile station 14. Through communication of the allocation message that contains values identifying the allocated resources, the mobile station is made aware of the allocated resources.

The mobile station includes structure analogous to structure of the network station. Here, the receive chain portion of the mobile station is shown. The mobile station includes an antenna transducer 64, an RF element 66, a baseband element 68, and a radio protocol stack 74. The RF element forms a wideband RF transceiver front end having a radio frequency of a bandwidth sufficiently wide to receive concurrently a plurality of radio frequencies upon which data is communicated during operation of an embodiment of the present invention.

The wideband RF transceiver provides for multi-carrier reception. Streams of data communicated to the mobile station upon separate carriers, within the range of operation of the RF transceiver are, e.g., independent data streams.

In one implementation, the antenna transducer 64 is representative of two, or more, spaced apart antennas, positioned to provide receiver diversity. The data received at the separate antennas, e.g., is sent upon the same carrier and the reception at the separate antennas provide for the receiver diversity.

The mobile station also includes a multi-carrier radio resource control logic element 78 pursuant to an embodiment of the present invention. The element 78 includes a detector 82 and a controller 84. And, the radio resource control logic element is coupled, at least functionally, to the radio protocol stack by way of the lines 86 and 88, to the baseband element 92, and to the RF transceiver forming the RF element by way of the line 94. In the exemplary implementation, the element 78 is embodied at a radio resource management layer.

The detector 82 operates to detect the allocation message sent by the network station to the mobile station. The detector extracts values contained in the allocation message, or otherwise identifies the communication resources allocated to the communication session to communicate the data pursuant to effectuation of a communication service. Detections made by the detector are provided to the controller 84. And, the controller operates to control operation of the mobile station so that the mobile station receives, and operates upon, the communicated data. The controller, for instance, controls operations of the various elements of the mobile station, including the wideband RF transceiver, to ensure that the radio elements are operable at the proper times to receive the data communicated over the different carriers. Thereby, intelligent control is provided to the mobile station.

Figure 2:
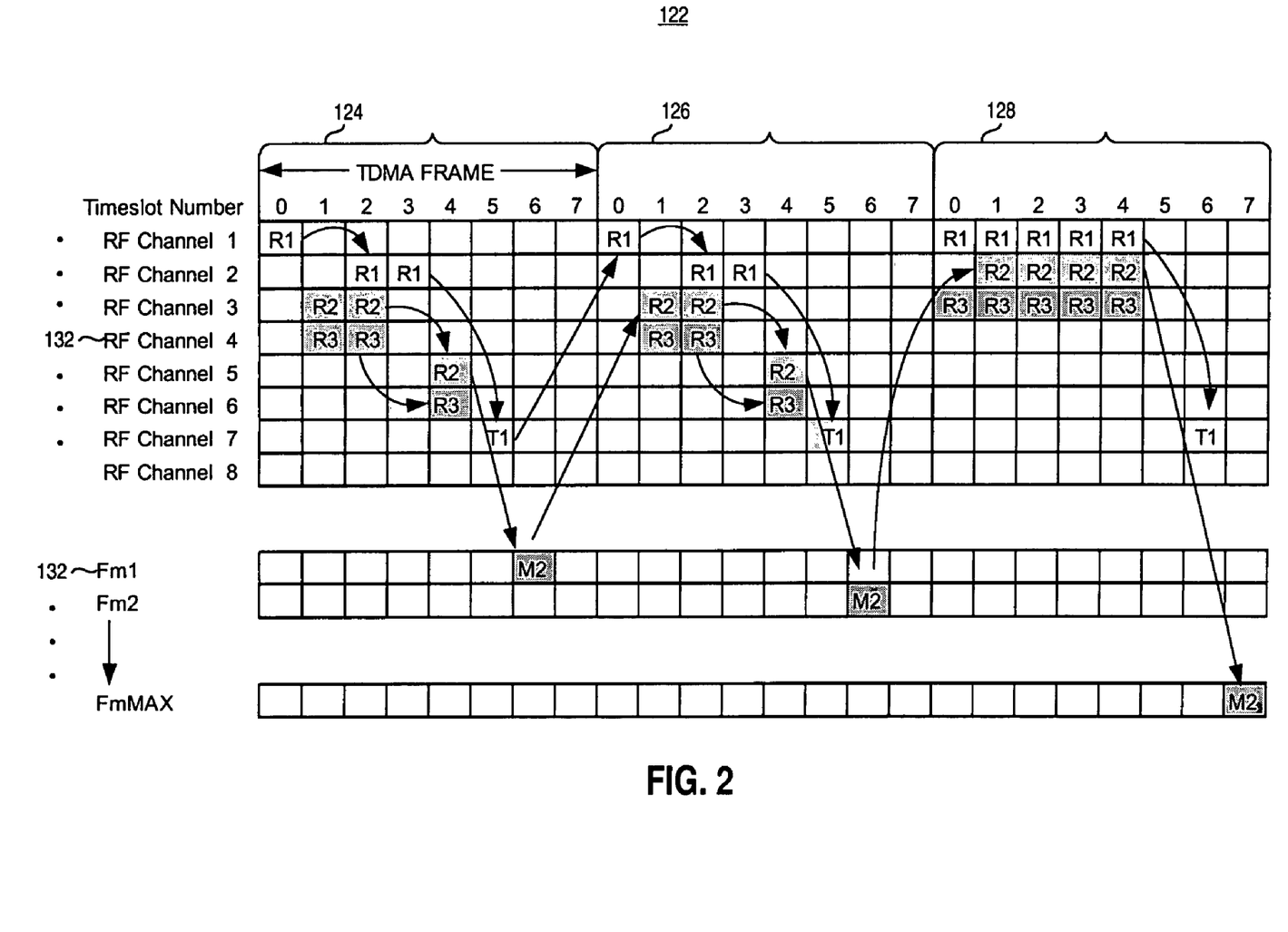
FIG. 2 illustrates a representation of exemplary communication resource allocation made pursuant to operation of an embodiment of the present invention.

FIG. 2 illustrates a representation, shown generally at 122, of communication resource allocations made for the communication of data pursuant to operation of an embodiment of the present invention. The representation illustrates three successive TDMA frames 124, 126, and 128, each of which includes eight time slots, numbered 0-7. Eight radio frequency carriers 132, identified as RF channels 1-8 of the inactive cell and carriers FM-1-FM-MAX of an adjacent cell all identify carriers identified in the exemplary communication system.

Here, the mobile station is capable of receiving data communicated on three RF carriers simultaneously. Communication resource allocations are made, therefore, with the constraint that the data be communicated upon no more than three carriers during any particular time slot. The references R1, R2, and R3 are shown in the figure to identify the three carriers, defined logically according to an MAIO scheme, upon which data is communicated to the mobile station during any particular time slot. The indications T and M identify periods during which data is transmitted by the mobile station and during which measurements are made by the mobile station.

Resource allocations are made, by the allocator 56 shown in FIG. 1, to maximize the sum of downlink time slots allocated to a single mobile station given the constraint that the mobile station receive data on no more than three carriers during any single time slot while also observing the reaction times Tta, Ttb, Tra, and Trb, as defined in the TS 45.002 [2], Annex B specification. The reaction times, generally, identify the time required of a mobile station to get ready to transmit or receive, respectively, before receiving a subsequent burst, transmitting a subsequent burst, or performing a measurement on an adjacent-cell signal.

In the exemplary implementation, carrier/time slot combinations are selected in terms of an MAIO (Mobile Allocation Index Offset) and time slot combination by "scavenging" for available resources according to the following equation:

$$\text{MAX:} \sum_{t=1}^{Nt} \sum_{R=1}^{Nr} S_{tR} u_{tR}; \quad u \in \{0, 1\}$$

$$St{:}u = \begin{cases} a = 1 \wedge f_r = f_{r+1} \vee (f_m = f_r \vee f_t = f_r){:}1 \\ \text{Else:}0 \end{cases}$$

Where:
t=timeslot number
R=RF deck number (both transmit and receive)
Nt=Maximum number of timeslots in allocation
Nr=Maximum number of RF decks available for simultaneous reception in mobile terminal
$S_{tR}$=Radio resource of timeslot "t" on RF deck "R" for mobile receiver
$u_{tR}$=Utilization of timeslot "t" on RF deck "R" permitted according to the reaction time constraints (Boolean)
a=Timeslot availability for allocation to mobile downlink (Boolean)

Because the resources are not limited to those available upon a single carrier, a substantially increased possibility of availability of communication resources to effectuate communication of data is possible. As EDGE-based, as well as other types of, communication services are increasingly data-intensive, the increased availability of communication resources permits data to be communicated more quickly than that conventionally available.

Figure 3:
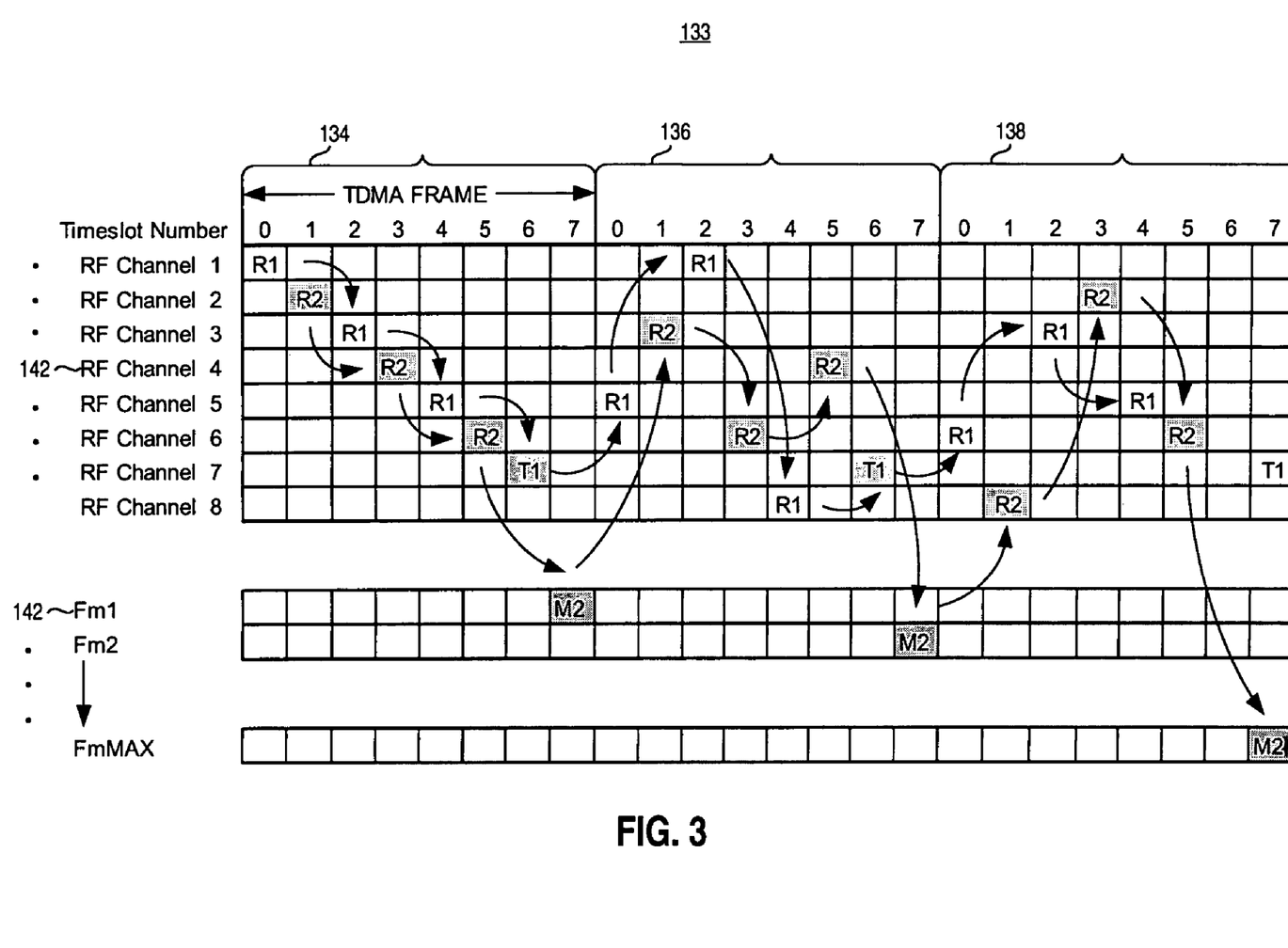
FIG. 3 illustrates a representation of another exemplary communication resource allocation made pursuant to operation of an embodiment of the present invention.

FIG. 3 illustrates a representation, shown generally at 133 of communication resource allocations made for the communication of data pursuant to operation of another embodiment of the present invention. The representation illustrates three successive TDMA frames, frames 134, 136, and 138, each of which includes eight time slots, numbered 0-7 in FIG. 3. Eight radio frequency carriers 142, identified as RF channels 1-8 of the inactive cell and carriers Fm 1-FmMAX of an adjacent cell all identify carriers identified in the exemplary communication system. During different timeslots, communication resources are allocated on differing carriers, and resources are not allocated concurrently on more than one carrier. The references R1 and R2 are shown in FIG. 3 to identify the two carriers upon which data is communicated in the example resource allocation in which two carriers are available upon which to communicate data upon any two adjacent time slots. The indications T and M identify periods during which data is transmitted by the mobile station and during which measurements are made by the mobile station, respectively.

Resource allocations are made, by the resource allocator 56 shown in FIG. 1, to maximize the sum of downlink time slots allocated to a single mobile station given the constraint that resource allocations are not made on separate radio carriers during concurrent time slots while also observing the reaction times Tta, Ttb, Tra, and Trb, as defined in the TS-45.002 [2], Annex B specification. The reaction times, generally, identify the time required of a mobile station to get ready to transmit or to receive, respectively, before receiving a subsequent burst, transmitting a subsequent burst, or performing a measurement on an adjacent-cell signal.

In this exemplary implementation, the carrier/time slot combinations are selected in terms of an MAIO (Mobile Allocation Index Offset) scheme by "scavenging" for available resources according to the following equation:

$$MAX: \sum_{t=1}^{Nt} \sum_{R=1}^{Nr} S_{tR} u_{tR}; \quad u \in \{0, 1\}$$

$$St:u = \begin{cases} a = 1 \wedge f_r \neq f_{r+1} \vee u_{t-1R} = 0:1 \\ \text{Else:0} \end{cases}$$

Where:
t=timeslot number
R=RF deck number (both transmit and receive)
Nt=Maximum number of timeslots in allocation
Nr=Maximum number of RF decks available for simultaneous reception in mobile terminal
$S_{tR}$=Radio resource of timeslot "t" on RF deck "R" for mobile receiver
$U_{tR}$=Utilization of timeslot "t" on RF deck "R" permitted according to the reaction time constraints (Boolean)
a=Timeslot availability for allocation to mobile downlink (Boolean)

Figure 4:
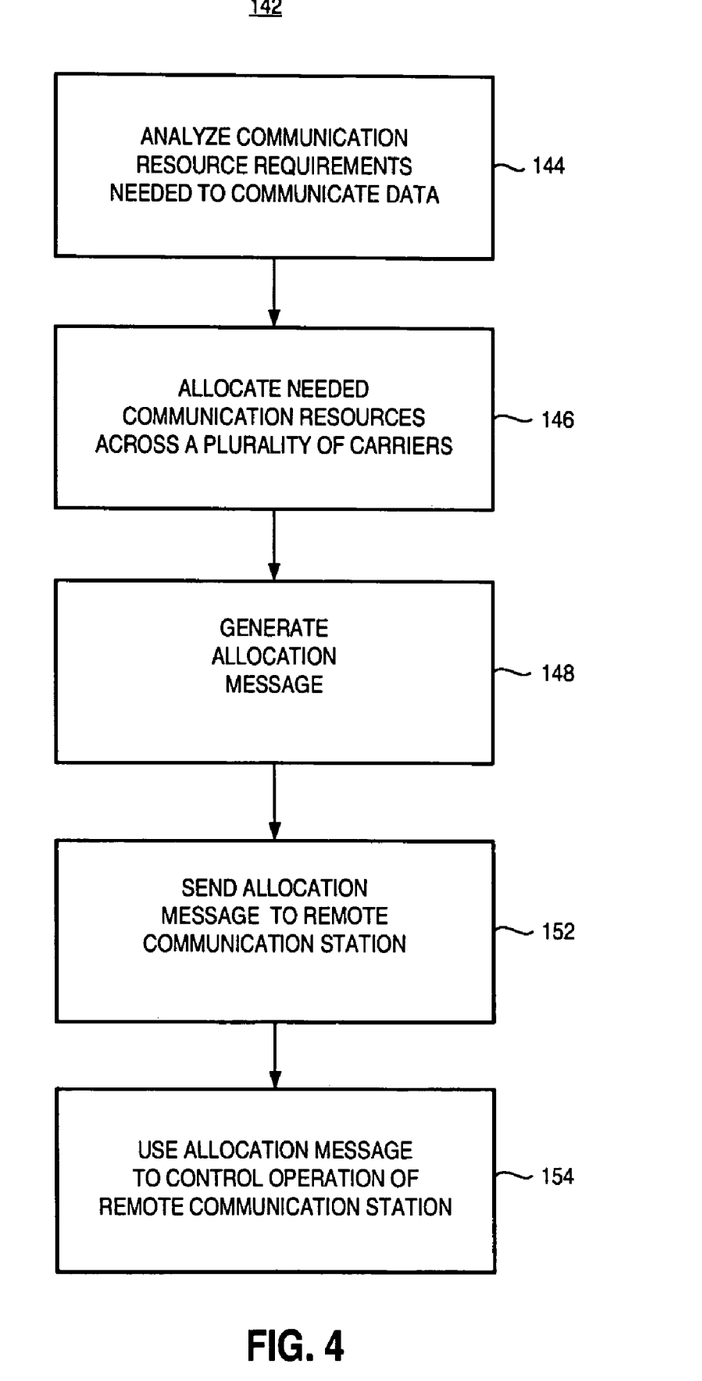
FIG. 4 illustrates a method flow diagram listing the method of operation of an embodiment of the present invention.

FIG. 4 illustrates a method flow diagram, shown generally at 142, representative of the method of operation of an embodiment of the present invention by which to communicate data between a set of communication stations in a communication scheme that provides for mobile allocation index offset or carrier frequency.

First, and as indicated by the block 144, communication requirements required for the communication of the data are analyzed. The analysis is performed responsive to an indication of a characteristic of the data. Then, and as indicated by the block 146, communication resources are allocated across a plurality of radio carriers for communication of the data, the data to be communicated by a wideband RF transceiver in accordance with the allocated resources.

Thereafter, and as indicated by the blocks 148 and 152, an allocation message is generated and sent by a sending communication station to a remote communication station that identifies allocations of the communication resources. And, as indicated by the block 154, the allocation message is used at the remote communication station to control its operation pursuant to communication of the data across the plurality of radio carriers.

Improved communication performance of a high-speed data service is thereby provided. Increased throughput rates relative to those achievable when resource allocations are limited to those of a single radio carrier is provided. Increasingly data-intensive data communication services are better able to be carried out without noticeable delay. The previous descriptions are of preferred examples for implementing the invention, and the scope of the invention should not necessarily be limited by this description. The scope of the present invention is defined by the following claims.

What is claimed is:

1. Apparatus for a first communication station operable to communicate data in a frequency-hopping communication scheme that utilizes-mobile allocation index offset, said apparatus comprising:
an analyzer adapted to receive an indication of a characteristic of the data that is to be communicated by the first communication station, said analyzer configured to analyze communication requirements required for communication of the data;
a resource allocator adapted to receive an indication of the analysis made by said analyzer, said resource allocator configured to dynamically allocate concurrently, a plurality of different resources formed of time slot and MAIO (mobile allocation index offset) combinations, in a time division multiple access (TDMA) frame, using a plurality of mobile allocation index offsets for communication of the data; and
a wideband radio frequency element adapted to receive an indication of allocation made by said resource allocator, said wideband radio frequency element operable across a plurality of radio carriers, and said wideband radio frequency element configured to operate in conformity with the resource allocation made by said resource allocator to transmit data across the plurality of the radio carriers.

2. The apparatus of claim 1 further comprising an allocation message generator adapted to receive the indication of allocation made by said resource allocator, said allocation message generator configured to generate an allocation message identifying the allocation made by said resource allocator.

3. The apparatus of claim 1 further comprising a baseband part adapted to be provided with the data to be communicated by the first communication station, said baseband part configured to generate a single signal representative of the data to be communicated and to provide the single signal to said wideband radio frequency element.

4. The apparatus of claim 1 wherein said resource allocator is further configured to generate a radio part communication station control message for application to said radio frequency element to control operation thereof pursuant to allocations made by said resource allocator.

5. The apparatus of claim 4 wherein values of the radio part communication station control message causes said radio frequency element to be operative to communicate the data upon the radio carriers upon which said resource allocator allocates the resources.

6. The apparatus of claim 1 wherein the first communication station further comprises a baseband part and wherein said resource allocator is coupled to said baseband part and is further configured to generate a baseband part communication station control message for application to the baseband part to control operation thereof pursuant to allocations made by said resource allocator.

7. The apparatus of claim 1 wherein said analyzer and said resource allocator are embodied at a radio resource management layer of a radio protocol stack defined at the first communication station.

8. The apparatus of claim 1 wherein the data comprises a plurality of data streams for communication pursuant to a plurality of data communication services and wherein the indication of the characteristic that said analyzer is adapted to receive comprises identification of a characteristic of each of the plurality of data streams.

9. The apparatus of claim 8 wherein the resources allocated by said resource allocator comprise separate resource allocations for communication of each of the plurality of the data streams.

10. The apparatus of claim 1 wherein the communication scheme defines frames that are divided into time slots, and wherein the resources allocated by said resource allocator are allocated to selected time slots, including at least two time slots concurrently upon separate radio carriers.

11. The apparatus of claim 10 wherein the resources allocated to selected time slots selected as a function both of time slot availability and reaction time requirements of the first communication station.

12. An apparatus for a communication station operable pursuant to communication of data in a frequency-hopping communication scheme that utilizes mobile allocation index offset, said apparatus comprising:
a wideband radio frequency element adapted to detect data communicated to the communication station across a plurality of radio carriers;
a detector configured to detect an allocation message delivered to the wideband radio frequency element, the allocation message identifying a plurality of communication resources dynamically allocated concurrently in a time division multiple access (TDMA) frame to the communication station for communication of the data, the resource allocation defined by time-slot and MAIO (mobile allocation index offset) combinations, using a plurality of mobile allocation index offsets; and
a controller adapted to receive an indication of detections made by said detector, said controller configured to generate a control signal responsive to the detections made by said detector, the control signal controlling operation of said wideband radio frequency element.

13. The apparatus of claim 12 wherein frames divided into time slots are defined in the communication scheme, and wherein the communication resources identified in the allocation message detected by said detector are allocated to selected time slots using the plurality of mobile allocation index offsets.

14. The apparatus of claim 12 wherein the data detected by said wideband radio frequency element across the plurality of carriers comprise independent data streams.

15. The apparatus of claim 12 wherein the first communication station comprises a baseband part and wherein said controller is further configured to generate a baseband part control message for application to the baseband part to control operation thereof pursuant to allocations identified in the allocation message.

16. A method for communicating data by a first communication station in a frequency-hopping communication scheme that utilizes mobile allocation index offsets, said method comprising the operations of:
analyzing communication requirements required for communication of the data responsive to an indication of a characteristic of the data;
dynamically allocating, responsive to analysis made during said operation of analyzing, a plurality of different communication resources formed of time-slot and MAIO (mobile allocation index offset) combinations, allocated concurrently in a time division multiple access (TDMA) frame, using a plurality of mobile allocation index offsets for communication of the data, the the different communication resources within a bandwidth of operation of a wideband radio frequency transceiver of the first communication station.

17. The method of claim 16 further comprising the operations of:
sending an allocation message that identifies allocations made during said operation of allocating to a second communication station; and
using the allocation message at the second communication station to control operation thereof for the communication of the data.

18. The method of claim 17 further comprising the operation of detecting data at a wideband radio frequency transceiver at the second communication station, the wideband radio frequency transceiver at the second communication station operated in conformity with the allocation message.

* * * * *